No. 710,932. Patented Oct. 7, 1902.

J. W. ZIMMERMAN.

MEASURING RECEPTACLE FOR LIQUIDS, &c.

(Application filed Feb. 13, 1902.)

(No Model.)

Witnesses.

L. S. Mann.

S. N. Pond.

Inventor,

John W. Zimmerman.

By Offield, Towle & Linthicum

Atty's.

THE NORRIS PETERS CO., PHOTO-LITHO., WASHINGTON, D. C.

UNITED STATES PATENT OFFICE.

JOHN W. ZIMMERMAN, OF CHICAGO, ILLINOIS.

MEASURING-RECEPTACLE FOR LIQUIDS, &c.

SPECIFICATION forming part of Letters Patent No. 710,932, dated October 7, 1902.

Application filed February 13, 1902. Serial No. 93,855. (No model.)

*To all whom it may concern:*

Be it known that I, JOHN W. ZIMMERMAN, a citizen of the United States, residing at Chicago, in the county of Cook and State of Illinois, have invented certain new and useful Improvements in Measuring-Receptacles for Liquids, &c., of which the following is a specification.

My invention relates to automatic measuring-receptacles for liquids—more particularly mugs, cups, steins, and the like—such as are commonly used in drawing off and serving milk, beer, and other beverages.

The object of the invention is to provide, in association with a receptacle of the class described and analogous classes, a simple indicating device having the nature of both an annunciator and a lock, which is actuated by the gravity of the contained liquid and which automatically gives notice to the attendant or operator of the reception of a predetermined quantity of liquid or other substance within the receptacle; and to this end my invention resides in the combination, with a receptacle of the general class mentioned and a handle pivoted thereto, of a spring-controlled indicator or annunciator actuated in consequence of a relative tilting movement between the receptacle and its handle set up by the gravity of the contained liquid.

I have illustrated my invention in the form which I prefer to employ in connection with the accompanying drawings, wherein—

Figure 1:
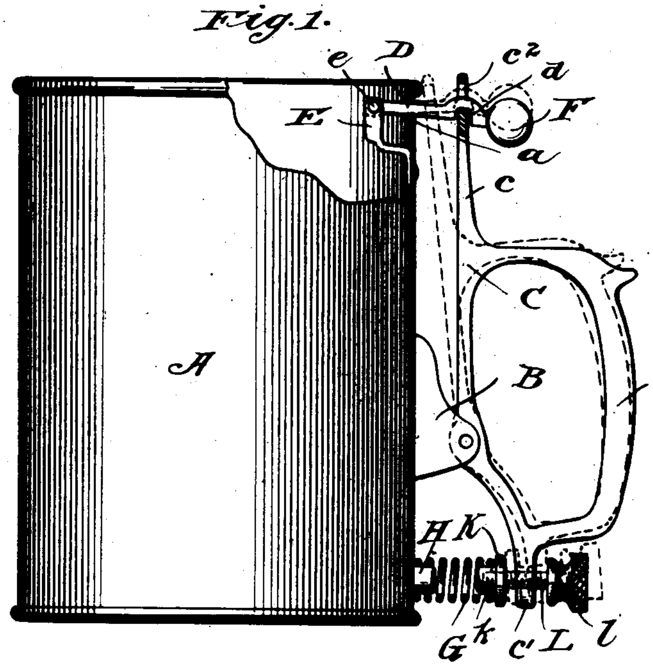
Figure 2:
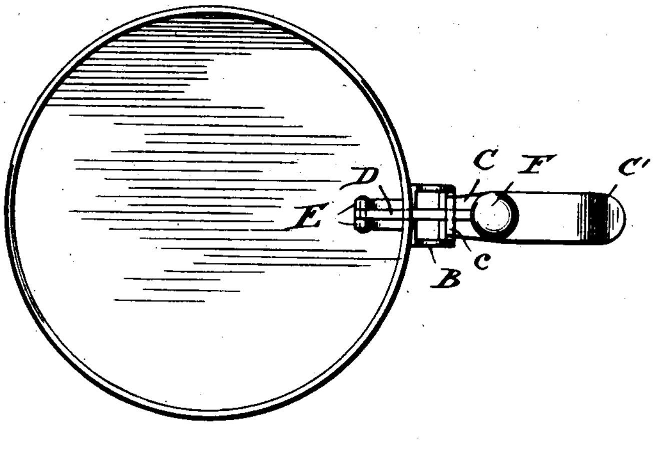

Figure 1 is a side elevation of a receptacle having my invention applied thereto and partly broken away to better illustrate the indicator mechanism, and Fig. 2 is a top plan view of the device complete.

Referring to the drawings, A indicates the receptacle, which is here shown in the form of a plain cylindrical mug or cup. To the outer surface of this mug and somewhat below the middle thereof is applied a bracket B, in which is pivoted a handle, (designated as a whole by C.) This handle has the usual loop-shaped handhold C' of a size and shape adapting it to be securely grasped and held by the hand of the attendant or user and comprises as auxiliary elements thereof for the purpose of my invention a vertical extension *c*, reaching approximately to the top of the mug, and a short depending lug *c'*, extending approximately to the level of the bottom of the mug. The upper end of the extension *c* is transversely slotted, as shown at $c^2$, to form a catch, as hereinafter described, and opposite this slotted portion of the handle the wall of the mug is similarly slotted, as shown at *a*. Through the slots thus formed is passed in a direction substantially normal to the cylindrical wall of the mug a latch-bar D, the inner end of which lies within the chamber of the receptacle and is pivoted at *e* in the upper end of a bracket E, secured to the inner wall of the receptacle just below the slot *a*. The latch-bar D is provided on its under edge, near the outer extremity thereof, with a locking-notch *d*, which may conveniently be formed, as shown, by a short upward curve or bend in the bar itself, while to the outer extremity of the bar is provided a weight, here shown as a ball F.

Against the outer wall of the mug, near its lower end and in radial line with the depending lug *c'* of the handle, is applied a coil compression-spring G, the inner end of the spring being conveniently seated by means of a radially-projecting boss H on the wall of the mug, which enters and snugly fits the inner end of the coil. The outer end of this spring contacts an abutment-disk K, the inner face of which is provided with a boss *k* similar to the boss H and entering the outer end of the spring, while the outer face of the disk K and its boss are centrally socketed to receive the inner end or point of a thumb-screw L, the stem or shank of which engages an internally-threaded aperture formed through the depending lug *c'* of the handle. The enlarged head of the thumb-screw is preferably milled or otherwise roughened, as shown at *l*, to facilitate the easy turning of the latter.

My invention operates in the following manner: The line of action of the spring G and the normal relative adjustment of the parts is such that when the mug is empty the lower portion of the handle is thrust outwardly by the spring, thereby carrying the upper end of the handle inwardly, with the upper end of its vertical extension *c* in contact with the upper rim of the mug and maintaining the weighted bar D elevated, all as shown by dotted lines in Fig. 1. The parts will maintain this relative position whether the receptacle be at rest on the table or bar or be supported by its handle in the grasp of the attendant or user, so long as it is empty. When, however, being held by its handle C, it is placed beneath a faucet or the like and the liquid is allowed to flow freely into the receptacle, the constantly-increasing weight of the liquid received serves to gradually tilt the body of the receptacle with reference to its pivoted handle, thereby causing the upper slotted end of the extension $c$ to gradually travel outward relatively to the upper margin of the receptacle on the bar D, at the same time compressing spring G until the base of the slot $c^2$, constituting a catch, encounters the notch $d$ of the bar, whereupon the latter will instantly drop, under the action of its weight F, into locking engagement with the vertical extension $c$. This interlocking of the latch-bar D with the handle constitutes a signal or annunciator to the user either that the receptacle has been properly filled with the amount of liquid intended to be served or that any other predetermined volume or amount has been drawn off, the volume to be drawn off being capable of exact determination in advance by the tensioning of the spring G, which is effected by the simple turning of the thumb-screw L. By increasing the expansive effect of the spring through compression of its coil an increased weight and consequent volume of liquid will be required within the receptacle before the latter will tilt relatively to its handle to such an extent as to effect the interlocking of the latch-bar D and the handle, while by decreasing the energy of the spring G by withdrawing the thumb-screw and partially relieving the compression of the coil a correspondingly-smaller volume and weight of liquid will suffice to effect the result described. The thumb-screw L forms an exceedingly sensitive device for this purpose. After the receptacle has been filled with the required quantity of liquid in the manner above described the handle remains locked in the full-line position shown in Fig. 1 relatively to the receptacle while its contents are poured out, thereby preventing any wabbling or unsteadiness of the body of the device in the hand of the user. When the receptacle is to be refilled, the operator conveniently trips the weighted end of the latch-bar D with the thumb of the hand by which the handle is grasped, thereby elevating the bar, unlatching the handle from the notch of the latter, and permitting it to snap back into the dotted-line position shown in Fig. 1 under the action of the spring G.

It will be readily understood that my invention is applicable to any and all kinds and classes of liquid receiving and measuring receptacles of the general character or type hereinabove specified. The receptacle shown at A may be an ordinary mug, cup, or stein, such as are commonly used for drinking purposes, of any material whatever, in which case my invention will ordinarily be used simply to indicate or announce when the receptacle has been filled to such an extent that it may be safely and properly served without liability of being slopped over in the act of serving or drinking the contents; or, again, the receptacle may serve to substitute the graduated measuring-receptacles now commonly employed in the retail sale of liquids and beverages of all kinds. It is also evident that my invention might be advantageously employed in connection with the dispensing of other than liquid goods, such as fine granular solid goods possessing sufficient mobility to run freely through a discharge-spout or the like. By experiment the spring G can readily be adjusted so that the weighted indicator-bar D will fall and interlock with the handle when any predetermined quantity, as a pint, quart, or other given volume, of liquid has been received, one adjustment of the spring obviously serving for use in drawing off any number of equal volumes of the same liquid or different liquids having the same specific gravity. My invention therefore is not limited to any particular character of receptacle nor to any particular material or materials of which it is made. Neither do I limit myself to the precise details of construction and relative arrangement of the several elements of my invention as herein shown and described, since they may obviously be varied to a considerable extent within the spirit and purview of my invention as defined in the following claims.

I claim—

1. In a measuring-receptacle of the class described, the combination with the body of the receptacle, of a handle pivoted thereto, a spring interposed between the body and the handle and normally opposing the gravity effect of the contained liquid to tilt the body relatively to the handle, and coöperating devices on the body and handle respectively adapted to automatically interlock when a predetermined quantity of liquid has been received, substantially as described.

2. In a measuring-receptacle of the class described, the combination with the body of the receptacle, of a handle pivoted intermediate its ends to one side thereof, a spring interposed between the body and one end of the handle and normally opposing the gravity effect of the contained liquid to tilt the body relatively to the opposite end of the handle, and coöperating devices on the body and said opposite end of the handle respectively adapted to automatically interlock when a predetermined quantity of liquid has been received, substantially as described.

3. In a measuring-receptacle of the class described, the combination with the body of the receptacle, of a handle pivoted intermediate its ends to one side thereof, a spring interposed between the body and the lower end of the handle and normally opposing the gravity effect of the contained liquid to tilt the body away from the opposite end of the handle, and coöperating devices on the upper ends of the body and handle respectively adapted to automatically interlock when a predetermined quantity of liquid has been received, substantially as described.

4. In a measuring-receptacle of the class described, the combination with a cup-shaped receptacle, of a handle pivoted intermediate its ends to one side thereof, a compression-spring interposed between the lower ends of the receptacle and handle and normally opposing the gravity effect of the contained liquid to separate the upper ends of the receptacle and handle, a latch-bar pivoted to the upper end of the receptacle and slidingly engaging the upper extremity of the handle, and interlocking devices on said latch-bar and handle adapted to coöperate and lock the handle rigidly to the receptacle when a predetermined quantity of liquid has been received, substantially as described.

5. In a measuring-receptacle of the class described, the combination with the body of the receptacle, of a handle pivoted intermediate its ends to one side thereof, a compression-spring interposed between the lower ends of the body and handle respectively and normally opposing the gravity effect of the contained liquid to separate the upper ends of the body and handle, a latch-bar pivoted to the upper end of the body, a coöperating catch carried by the handle, and means for effecting the interlocking engagement of said latch-bar and catch when a predetermined quantity of liquid has been received, substantially as described.

6. In a measuring-receptacle of the class described, the combination with the body of the receptacle, of a handle pivoted intermediate its ends to one side thereof, said handle including a vertical extension slotted at its upper end, a compression-spring interposed between the lower ends of the body and handle respectively and normally opposing the gravity effect of the contained liquid to separate the upper ends of the body and handle, a latch-bar pivoted to the upper end of the body and provided with a weight and with a notch in its under edge, said latch-bar passing through the slot in the vertical extension of the handle and interlocking therewith by means of its notch when the desired quantity of liquid has been received, substantially as described.

JOHN W. ZIMMERMAN.

Witnesses:

SAMUEL N. POND,

FREDERICK C. GOODWIN.